United States Patent

[11] 3,573,885

| [72] | Inventors | Darrell S. Brawn |
| | | Livonia; |
| | | Bogdan Lisowsky, Detroit, Mich. |
| [21] | Appl. No. | 784,623 |
| [22] | Filed | Dec. 18, 1968 |
| [45] | Patented | Apr. 6, 1971 |
| [73] | Assignee | Eaton Yale & Towne Inc. |
| | | Cleveland, Ohio |

[54] VEHICLE SAFETY APPARATUS FOR RESTRAINING OCCUPANT
18 Claims, 5 Drawing Figs.

[52] U.S. Cl. .................................................. 280/150
[51] Int. Cl. .................................................. B60r 21/08
[50] Field of Search .......................................... 280/150;
244/138; 293/1, 52

[56] References Cited
UNITED STATES PATENTS

| 2,713,466 | 7/1955 | Fletcher et al. | 244/138 |
| 2,958,487 | 11/1960 | Fraebel | 244/138 |
| 3,243,822 | 5/1966 | Lipkin | (280/150UX) |

*Primary Examiner*—Kenneth H. Betts
*Attorney*—Yount and Tarolli

ABSTRACT: An improved safety apparatus for protecting an occupant of a vehicle during an accident includes a confinement. Upon the occurrence of an accident, the confinement is inflated to an expanded condition to restrain movement of the occupant by absorbing kinetic energy. To minimize rebound of the occupant from the confinement, an exhaust or blowout assembly is provided for dissipating the absorbed kinetic energy by enabling fluid to be discharged from the confinement. The exhaust or blowout assembly includes a patch which is ruptured or blown out of a blocking relationship with an aperture or opening in the confinement by fluid pressure. To preserve the integrity of the exhaust assembly until a predetermined fluid pressure is present within the confinement, the patch is mounted in such a manner as to enable relative movement to occur between the patch and the confinement.

PATENTED APR 6 1971

INVENTORS
DARRELL S. BRAWN
BOGDAN LISOWSKY
BY
Yount, Flynn & Tarolli
ATTORNEYS

VEHICLE SAFETY APPARATUS FOR RESTRAINING OCCUPANT

The present invention relates to a safety apparatus of the type having a confinement which restrains movement of an occupant of a vehicle during an accident.

A known safety apparatus for protecting an occupant of a vehicle during an accident includes a confinement which is inflated to restrain movement of the occupant by absorbing kinetic energy. To minimize rebound of the occupant from the confinement, an exhaust or blowout assembly is provided for dissipating the absorbed kinetic energy. To this end, the exhaust assembly includes an exhaust or blowout patch which is ruptured to enable fluid to flow out of the confinement when a predetermined fluid pressure is present within the confinement. Heretofore, problems have been encountered in using this known safety apparatus due to a premature rupturing of the exhaust or blowout patch. Premature rupturing of the exhaust or blowout patch was caused by stresses resulting from arresting the rapidly moving confinement at its extremity of travel in the direction or initial inflation. These stresses fall in a general plane passing through an arresting support. This premature rupturing of the exhaust or blowout patch can result in an inadequate inflation of the confinement and an impairment of the protection provided to the occupant by the safety apparatus.

Accordingly, it is an object of this invention to provide a new and improved exhaust or blowout assembly associated with a confinement for restraining movement of an occupant of a vehicle during an accident and wherein the exhaust assembly maintains its integrity until a predetermined fluid pressure is provided within the confinement.

Another object of this invention is to provide a new and improved exhaust or blowout assembly associated with a confinement for restraining movement of an occupant of a vehicle during an accident and wherein the exhaust assembly is constructed so as to withstand stresses resulting from initial inflation of the confinement.

Another object of this invention is to provide a new and improved safety apparatus of the type having a confinement for restraining movement of an occupant of a vehicle during an accident, including a means for mounting an exhaust or blowout patch on a wall of the confinement in such a manner as to enable relative movement to occur between the blowout patch and the confinement while maintaining the blowout patch in a blocking relationship with an opening in the confinement.

Another object of this invention is to provide a new and improved vehicle safety apparatus of the type having a confinement for restraining movement of an occupant of a vehicle during an accident, including means for mounting an exhaust or blowout patch of a relatively inelastic or brittle material on a relatively elastic or stretchable wall of the confinement in such a manner as to enable relative movement to occur between the blowout patch and the confinement to thereby minimize premature rupturing of the patch under the influence of stresses induced during initial inflation of the confinement.

Another object of this invention is to provide a safety apparatus including a confinement inflatable from a collapsed condition to an expanded condition to restrain movement of an occupant of a vehicle during an accident by at least partially absorbing the kinetic energy of the occupant, an exhaust opening being formed in the confinement for enabling fluid to flow from the interior of the confinement to at least partially dissipate the absorbed kinetic energy, and patch means for at least partially blocking the exhaust opening wherein a new and improved mounting means is provided for enabling relative movement to occur between the patch means and the confinement while the patch means is blocking the exhaust opening to thereby tend to minimize stress applied to the patch means.

These and other objects and features of the invention will become more apparent upon a consideration of the following description taken in connection with the accompanying drawings wherein.

The present invention provides a safety apparatus having a confinement which is inflated from a collapsed condition to an expanded condition to restrain movement of an occupant of a vehicle during an accident by absorbing his kinetic energy. To minimize rebound of the occupant from the confinement, an exhaust or blowout assembly is provided for enabling the kinetic energy absorbed by the confinement to be dissipated. To this end, the exhaust or blowout assembly includes a patch which is ruptured or forced out of blocking relationship with an opening in the confinement to enable fluid to flow from the interior of the confinement.

The confinement must be quickly inflated from the collapsed condition to the expanded condition to protect an occupant of the vehicle during an accident. Due to the extreme speed with which the confinement is inflated and the arresting of the rapidly moving confinement near the extremity of its travel, relatively large stresses are produced therein. To provide for rupturing of the blowout or exhaust patch at a desired fluid pressure, the patch is made of a relatively inelastic or brittle material having different elongation characteristics than the material forming the confinement. The different elongation characteristics of the material forming the confinement and the patch results in the application of excessive stress to the patch and premature rupturing of the patch during inflation of the confinement as a result of the stresses produced therein.

To prevent the relatively brittle patch from being prematurely ruptured by stretching of the relatively elastic confinement upon expansion of the confinement, the patch is mounted so that relative movement can occur between the patch and the confinement in the general direction of confinement deployment. This provision for relative movement between the patch and confinement enables the confinement to be stretched or deformed by such stresses without rupturing the patch or otherwise impairing its ability to block the opening in the confinement. Once a predetermined pressure is present in the confinement, the patch is forced or blown away from the opening to enable fluid to flow from the confinement and thereby relieve fluid pressure in the confinement.

Figure 1:
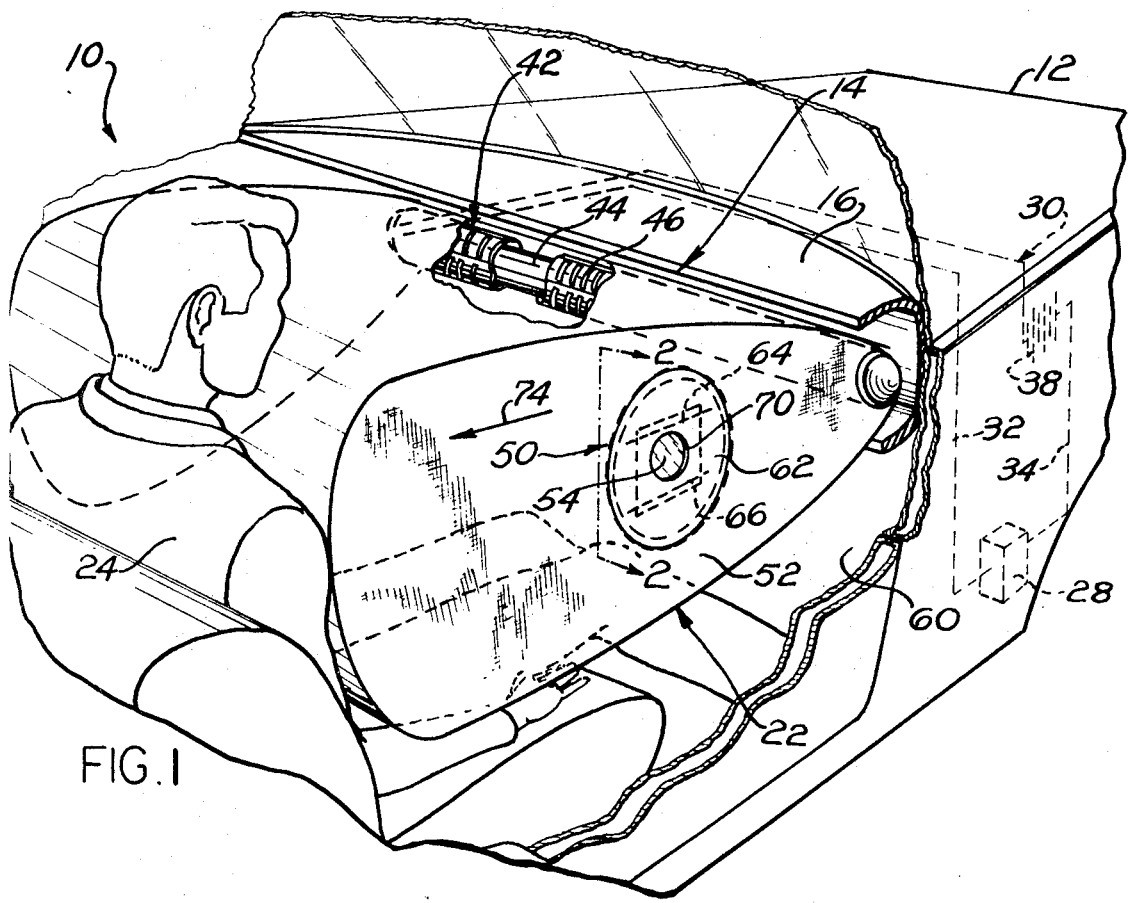
FIG. 1 is a schematic illustration of a vehicle in which there is provided a safety apparatus having a confinement which is inflated to the illustrated expanded condition to restrain movement of an occupant of the vehicle during an accident.

Although a safety apparatus 10 constructed in accordance with the present invention can be used to protect occupants of many different types of vehicles, such as tractors, trucks, boats and airplanes, the safety apparatus 10 is illustrated in FIG. 1 in connection with an automotive vehicle 12. The safety apparatus 10 includes a safety device 14 which, in the illustrated embodiment of the invention, is mounted on a dashboard 16 of the vehicle 12. The safety device 14 includes a confinement 22 which is normally stored in a collapsed condition (not shown) on the dashboard 16. Upon the occurrence of an accident, the confinement 22 is inflated to an expanded condition shown in FIG. 1. In the expanded condition, the confinement 22 protects an occupant 24 of the vehicle 12 during an accident by restraining his movement and absorbing his kinetic energy.

A known sensor assembly 28 (FIG. 1) is provided for detecting the occurrence of an accident and activating the safety device 14. To this end, the sensor assembly 28 is connected with the safety device 14 by electrical circuitry 30 which includes leads 32 and 34. The leads 32 and 34 are energized by the battery 38 upon operation of the sensor assembly 28 to activate an inflation assembly 42.

Activation of the inflation assembly 42 provides a flow of fluid to inflate the confinement 22 from a collapsed condition to the illustrated expanded condition. To provide this flow of fluid, the inflation assembly 42 includes a source of fluid, in the present instance a reservoir 44, and a diffuser 46 for directing a flow of fluid from the reservoir 44 to expand the confinement rearwardly in a predetermined manner. A forward end portion of the confinement is secured to the diffuser 46 which is fixedly mounted on the dashboard 16. Once inflated, the confinement 22 restrains movement of the occupant 24 to thereby protect the occupant during an accident.

To minimize rebound of the occupant from the confinement 22, an exhaust or blowout assembly 50 (see FIGS. 2 and 3) is provided in a wall 52 of the confinement to dissipate kinetic energy absorbed by the confinement in restraining the movement of the occupant. To dissipate the absorbed kinetic energy, the exhaust or blowout assembly 50 enables fluid to flow from the confinement 22. Accordingly, the exhaust assembly 50 includes a patch 54 of a relatively inelastic material (such as "Teflon"), which is ruptured or released by a predetermined fluid pressure within the confinement. The patch 54 is then forced or blown out of blocking or sealing relationship with a generally circular opening 58 (see FIG. 3) formed in the wall 52 of the confinement 22. This enables fluid to flow from the interior of the confinement 22 into a passenger compartment 60 (FIG. 1) of the vehicle to thereby reduce the fluid pressure in the confinement.

Upon operation of the sensor assembly 28, the inflation assembly 42 is operated to quickly inflate the confinement 22 from the collapsed condition to the illustrated expanded condition under the influence of high-pressure fluid from the reservoir 44. During initial inflation of the confinement 22 the patch 54 is held by an outer reinforcing disc or cover 62 and stitching 64 and 66. While the patch 54 is so held, it blocks the opening 58 in the wall 52 and an aligned circular opening 70 in the reinforcing disc 62.

When a predetermined fluid pressure is present within the confinement 22, the fluid pressure acts against the patch 54 to rupture the patch along the stitching 64 and/or 66. Tests indicate a general rupture along only one seam. This is desirable as the patch material remains attached to the confinement rather than floating through air. The fluid forces or blows the patch outwardly through the aperture 70 in the outer reinforcing disc 62 (see FIG. 1). This enables fluid to escape from the interior of the confinement 22 to relieve the pressure within the confinement. The escaping fluid dissipates kinetic energy absorbed by the confinement 22 in restraining movement of the occupant 24 to thereby minimize rebound of the occupant from the confinement in the manner fully explained in application, Ser. No. 621,848 filed Mar. 9, 1967, now U.S. Pat. No. 3,418,648 by William R. Carey and David C. King and entitled Vehicle Safety System.

Upon initiation of inflation of the confinement, the confinement is expanded with a sudden movement and the inflation is abruptedly arrested, which results in the formation of stresses in the walls of the confinement. This abrupt arresting causes the confinement 22 to be snapped or moved suddenly rearwardly, that is in the direction of the arrow 74 in FIG. 1, and large stresses are induced into the wall 52 of the confinement in directions which are generally parallel to the stitching 64 and 66. To enable the confinement 22 to remain intact when subjected to these stresses the confinement is made of a relatively elastic or stretchable material, such as Hypolon-coated nylon fabric. Therefore, the stresses induced by high-speed expansion of the confinement 22 tend to stretch or otherwise deform the wall 52 to the confinement in the manner illustrated schematically in FIG. 4. This deformation of the wall 52 results in the corresponding stretching or elongation of the exhaust or blowout assembly 50 in a direction generally parallel to the direction of the arrow 74.

To prevent the relatively inelastic patch 54 from being prematurely ruptured or torn by the stresses induced during initial inflation and stretching of the confinement 22, the patch is mounted so as to enable relative movement to occur between the patch and the wall 52 of the confinement. To this end, the stitching 64 and 66 extends generally parallel to the major direction of stress resulting from the snap-arrest of the confinement and stretching or elongation of the wall 52 of the confinement 22. Transversely extending end or side portions 78 and 80 of the patch 54 are free or unrestrained so that the wall 52 is free to move relative to the patch without tearing or rupturing the patch. Therefore, upon arrest of the confinement 22 during initial inflation, relative movement occurs between the patch 54 and wall 52 of the confinement in a direction generally parallel to the stitching 64 and 66. Since this major axis of stress is parallel to the direction in which there is freedom of relative movement between the patch 54 and wall 52, the patch is not ruptured by the stress induced in the wall 52.

Figure 2:
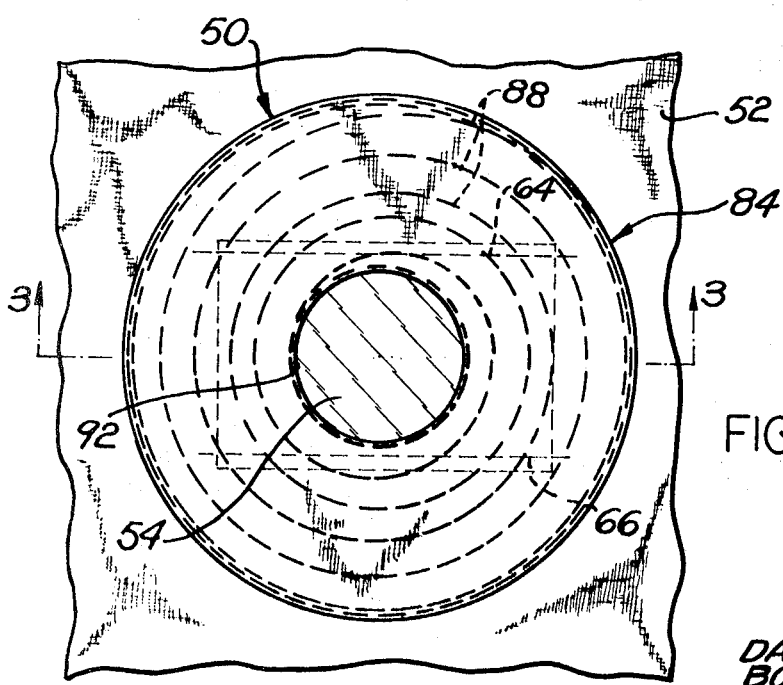
FIG. 2 is an enlarged fragmentary view, taken generally along the line 2—2 of FIG. 1, illustrating the structure of an exhaust or blowout assembly for minimizing rebound of the occupant from the confinement.
Figure 3:
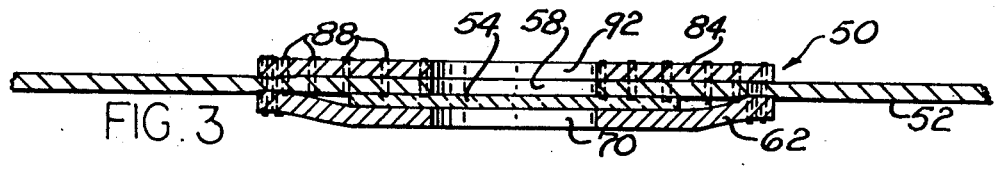
FIG. 3 is a sectional view, taken along the line 3—3 of FIG. 2, further illustrating the structure of the exhaust or blowout assembly.

To minimize deformation or elongation of the exhaust or blowout assembly 50, an inner reinforcing disc or member 84 is advantageously secured to the wall 52 by stitching 88 (FIGS. 2 and 3). Of course, the inner reinforcing disc 84 has a generally circular opening 92 which is aligned with the openings 58 and 70 in the wall 52 and outer reinforcing disc 62. These axially aligned openings enable fluid to be exhausted from the interior of the confinement upon the rupturing or tearing of the patch 54. It should be noted that the stitching 88 spirals inwardly (FIG. 2) from a radially outer edge portion of the inner reinforcing disc 84 to securely attach the inner reinforcing disc to the wall 52 of the confinement 22 and thereby stiffen the wall 52 in the area around the exhaust openings 58, 70 and 92.

The patch 54 has been illustrated in FIGS. 1—3 in association with a pair of reinforcing discs 62 and 84 which retard deformation of the wall 52 in the area of the exhaust opening 58. These reinforcing discs also function to hold the patch 54 in a blocking relationship with the exhaust opening. However, it is contemplated that the patch 54 will also be mounted by the use of a single reinforcing disc or member, such as the outer reinforcing disc 100 of the embodiment 102 of the exhaust or blowout assembly illustrated in FIG. 5. Since the embodiment of the invention illustrated in FIG. 5 is generally similar to the embodiment of the invention illustrated in FIGS. 1—4, like numerals will be used to designate like parts, the suffix letter *a* being used to distinguish the numerals associated with the embodiment of FIG. 5 to avoid confusion.

Figure 5:
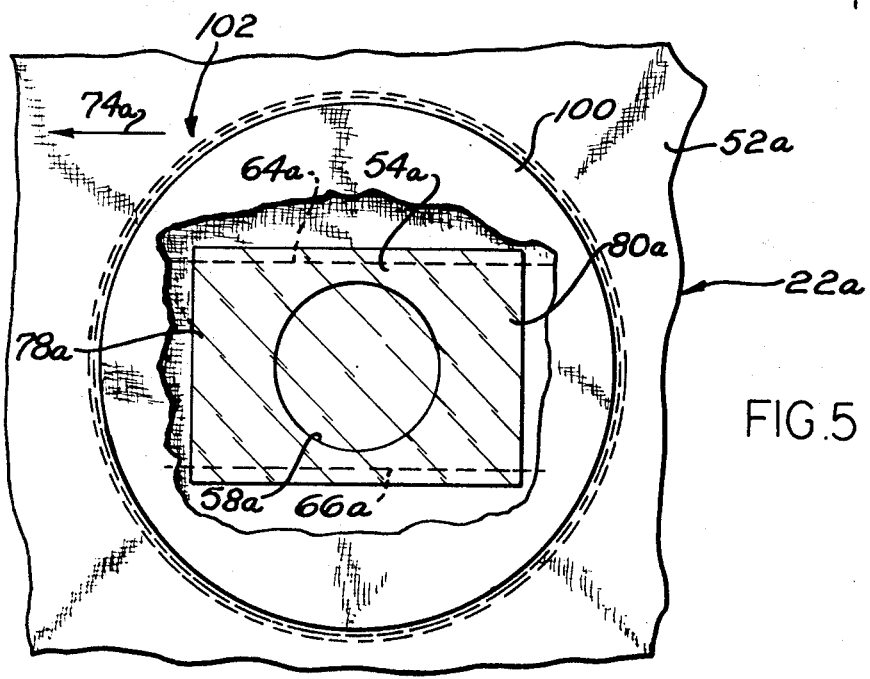
FIG. 5 is an enlarged fragmentary view, generally similar to FIG. 2, illustrating the structure of the second embodiment of the exhaust or blowout assembly.

In the embodiment illustrated in FIG. 5, the patch 54a is held in a blocking relationship with the opening or aperture 58a in the wall 52a of a confinement 22a by stitching 64a and 66a. This stitching extends generally parallel to a main axis of deformation and stress which is induced in the wall 52a upon arrest of the confinement 22a. End portions 78a and 80a of the patch 54a are free or unrestrained to enable relative movement to occur between the wall 52a and the patch 54a without tearing or rupturing the patch.

Figure 4:
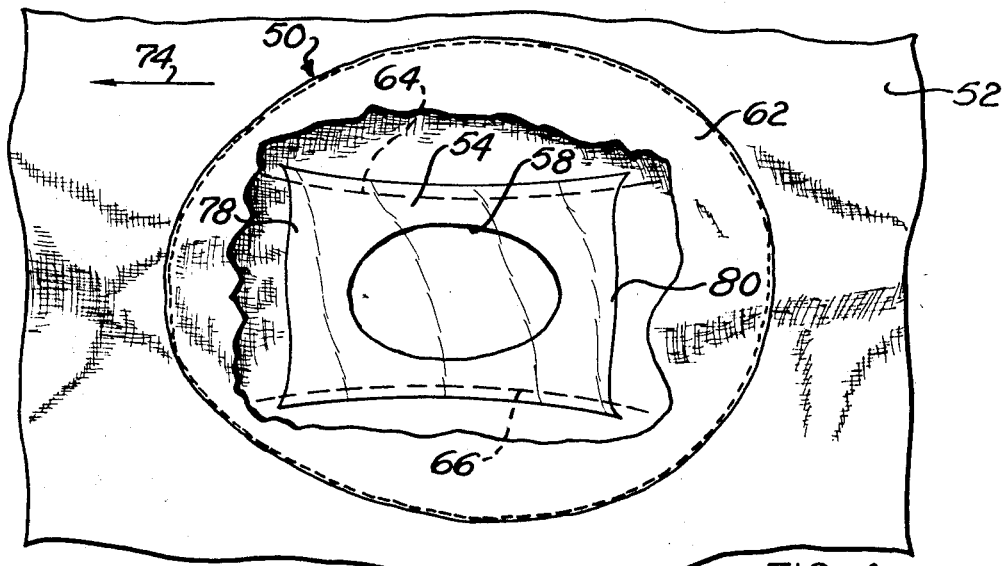
FIG. 4 is a highly schematized illustration depicting the relationship of the exhaust or blowout assembly to a wall of the confinement during inflation of the confinement to the fully expanded condition of FIG. 1.

Although stitching 64, 66 and 64a, 66a has been used in the embodiments of FIGS. 4 and 5 to mount the patches 54 and 54a in the walls 52 and 52a of the confinement, it is contemplated that other types of connection means could be utilized for mounting the patches. In addition, it is believed that the connection means does not have to extend for substantially the entire distance between the unrestrained end portions of the patches, as does the stitching 64, 66 and 64a, 66a.

In view of the foregoing description, it is apparent that upon the occurrence of an accident it is desirable to quickly inflate the confinement 22 to a fluid pressure which is sufficient to enable the confinement to restrain movement of the occupant 24. In addition, it is desirable to minimize rebound of the occupant 24 from the confinement 22 by dissipating kinetic energy absorbed by the confinement in restraining movement of the occupant. To these ends, the blowout patch 54 is mounted so that relative movement can occur between the patch and the confinement 22. This provision for relative movement prevents the patch 54 from being prematurely ruptured and thereby enables the confinement to be quickly inflated to a pressure sufficient to enable the confinement to effectively restrain movement of the occupant 24. Once the desired fluid pressure has been obtained in the confinement 22, the patch 54 will be ruptured or torn to enable fluid to escape from the confinement and thereby dissipate the kinetic energy absorbed by the confinement.

To provide for relative movement between the patch 54 and the confinement 22, the patch is attached to the wall 52 by stitching 64 and 66. This stitching leaves the end portions 78 and 80 free to move relative to the wall 52. Accordingly, the stitching 64 and 66 extends generally parallel to the main or major direction of expansion of the confinement 22 and the main or major axis along which stress is induced in the wall 52. The end portions 78 and 80 of the patch 54 are free to enable the wall 52 to be stretched under the influence of these stresses without tearing or rupturing the patch 54. This assures that the patch 54 will be maintained in a blocking relationship with the exhaust openings 58, 70 and 92 until the fluid pressure within the confinement 22 is sufficient to restrain the movement of the occupant 24 of the vehicle 12.

From the above it can be seen that the integrity of the patch is maintained due to the fact that the confinement can be stretched along the major stress A and is (due to arrest of the deploying confinement) relative to the patch during inflation. This should be contrasted with a construction in which the end portions 78 and 80 of the patch 54 are secured to the wall 52 of the confinement 22 by stitching extending transversely to the main axis of deformation and stress in the wall. In such a construction relative movement between the patch and wall would be retarded. This would result in the patch 54 being prematurely torn or ruptured in the area of the transversely extending stitching. Of course, premature rupturing of the patch 54 would enable fluid to flow through the exhaust openings 58, 70 and 92 before the confinement 22 was inflated to a fluid pressure required to adequately restrain movement of the occupant 24 during an accident.

If the patch 54 was made of a material having sufficient strength to resist the relatively large stresses which are induced in the confinement 22 upon initiation of inflation, the patch 54 could then be completely circumscribed by stitching without premature rupturing of the patch. However, if this was done the confinement 22 would have to be inflated to a relatively high fluid pressure before the patch 54 would rupture. Such a relatively high fluid pressure is to be avoided since it tends to induce rebounding of the occupant 24 from the confinement 22.

We claim:

1. Safety apparatus for protecting an occupant of a vehicle during an accident, said safety apparatus comprising a confinement expandable from a collapsed condition to an expanded condition in which the confinement is adapted to restrain movement of the occupant during an accident, means for effecting expansion of said confinement to the expanded condition in such a manner as to induce stress in at least one direction in said confinement, and means for dissipating the kinetic energy of the occupant including exhaust opening means, patch means having a first condition for at least partially blocking said exhaust opening means and a second condition providing for dissipation of the kinetic energy of the occupant and means for mounting said patch means on said confinement and for enabling relative movement to occur in at least said one direction between said patch means and said confinement while maintaining said patch means in said first condition to at least in part isolate said patch means from said stresses.

2. Safety apparatus as set forth in claim 1 wherein said means for mounting said patch means on said confinement includes reinforcing means secured to said confinement for strengthening said confinement in an area around said exhaust opening means.

3. Safety apparatus as set forth in claim 2 wherein said patch means is positioned between said reinforcing means and said confinement.

4. Safety apparatus as set forth in claim 1 wherein said means mounting said patch means on said confinement includes reinforcing means for strengthening said confinement around said exhaust opening means, said reinforcing means cooperating with said confinement to form a pocket extending around said exhaust opening means, said patch means being disposed in said pocket.

5. Safety apparatus as set forth in claim 1 wherein said confinement is made of a first material and said patch means is made of a second material, said first material having a greater elasticity than said second material so that said confinement is stretched relative to said patch means upon expansion of said confinement.

6. Safety apparatus as set forth in claim 1 wherein said mounting means for said patch means includes means for connecting portions of said patch means to said confinement.

7. Safety apparatus as set forth in claim 1 wherein said means for expanding said confinement includes a source of fluid and means for directing a flow of fluid from said source of fluid in such a manner as to expand said confinement outwardly in said one direction.

8. Safety apparatus as set forth in claim 1 wherein said mounting means secures said patch means to said confinement in such a manner as to oppose relative movement between said patch means and said confinement in a direction transverse to said one direction.

9. Safety apparatus for protecting an occupant of a vehicle during an accident, said safety apparatus comprising a confinement expandable from a collapsed condition to an expanded condition in which said confinement is disposed to restrain movement of the occupant during an accident, and means for supplying fluid to expand said confinement upon the occurrence of an accident, said confinement having means for dissipating kinetic energy of the occupant absorbed by the confinement including exhaust opening means for enabling fluid pressure within the confinement to be relieved therefrom, patch means for at least partially blocking said exhaust opening means to thereby facilitate initial inflation of said confinement, and means for mounting said patch means to allow for relative movement in the direction of confinement expansion between at least a portion of said patch means and said confinement while maintaining said patch means in a blocking relationship with said exhaust opening means to thereby minimize any tendency for premature rupturing of the patch means during initial inflation of said confinement, said patch means being adapted to be forced out of the blocking relationship with said exhaust opening means under the influence of fluid pressure in said confinement to thereby enable fluid to escape from the interior of said confinement to minimize any tendency of the occupant to rebound from said confinement.

10. Safety apparatus as set forth in claim 9 wherein said mounting means includes reinforcing means for strengthening said confinement in an area around said exhaust opening means.

11. In a safety apparatus including a confinement inflatable from a collapsed condition to an expanded condition in which said confinement is adapted to restrain movement of an occupant of the vehicle during an accident, means for supplying fluid to inflate said confinement from the collapsed condition to the expanded condition upon the occurrence of an accident, exhaust opening means formed in said confinement for enabling fluid to flow from the interior of said confinement, and patch means having a first condition for at least partially blocking said exhaust opening means until a predetermined fluid pressure is present within said confinement and a second condition providing for fluid flow through said exhaust opening means, the combination with said patch means and confinement of mounting means for enabling relative movement to occur between said patch means and said confinement while said patch means is in said first condition and at least partially blocking said exhaust opening means to thereby minimize the stress applied to said patch means by inflation of said confinement to the expanded condition.

12. Safety apparatus for protecting an occupant of a vehicle during an accident, said safety apparatus comprising a confinement inflatable from a collapsed condition to an expanded condition in which said confinement is adapted to restrain movement of an occupant of the vehicle, a source of fluid connected in fluid communication with said confinement for inflating said confinement to the expanded condition upon the occurrence of an accident, said confinement including an opening which is adapted to enable fluid to escape from said confinement to minimize any tendency of the occupant to rebound from the confinement, and a patch mounted on said confinement in a blocking relationship with the opening in said confinement and adapted to be moved away from the opening under the influence of the fluid pressure within the confinement when this fluid pressure reaches a predetermined fluid pressure, said patch being formed of a material having a lower elasticity than said confinement and being mounted on said confinement with at least one portion of said patch unrestrained against relative movement between said patch and said confinement to thereby enable said confinement to move relative to said one portion of said patch upon inflation of said confinement while said patch is in the blocking relationship with the opening in said confinement.

13. An exhaust assembly associated with a confinement which is expanded to restrain movement of an occupant of a vehicle during a collision wherein the exhaust assembly comprises patch means having a first condition for at least partially blocking an exhaust opening in the confinement and a second condition providing for dissipation of the kinetic energy of the occupant by enabling fluid to flow from said exhaust opening, and means for mounting said patch means on said confinement and enabling relative movement to occur in the general direction of confinement expansion between said patch means and said confinement while maintaining said patch means in said first condition to minimize stress in said patch means effected by expansion of said confinement.

14. An exhaust assembly as set forth in claim 13 wherein said patch means is made of a material which is relatively inelastic compared to a material forming the confinement.

15. Safety apparatus for protecting an occupant of a vehicle during an accident, said safety apparatus comprising a confinement expandable from a collapsed condition to an expanded condition in which said confinement is disposed to restrain movement of the occupant during an accident, and means for supplying fluid to expand said confinement upon the occurrence of an accident, said confinement having means for dissipating kinetic energy of the occupant absorbed by the confinement including exhaust opening means for enabling fluid pressure within the confinement to be relieved therefrom, patch means for at least partially blocking said exhaust opening means to thereby facilitate initial inflation of said confinement, and means for mounting said patch means to allow for relative movement in the direction of confinement expansion between at least a portion of said patch means and said confinement while maintaining said patch means in a blocking relationship with said exhaust opening means to thereby minimize any tendency for premature rupturing of the patch means during initial inflation of said confinement, said mounting means including means for securing said patch means to said confinement with said portion of said patch means unrestrained against limited movement relative to said confinement and other portions of said patch means restrained against movement relative to said confinement.

16. Safety apparatus as set forth in claim 15 wherein said means for securing said patch means to said confinement includes stitching extending through said other portions of said patch means.

17. In a safety apparatus including a confinement inflatable from a collapsed condition to an expanded condition in which said confinement is adapted to restrain movement of an occupant of the vehicle during an accident, means for supplying fluid to inflate said confinement from the collapsed condition to the expanded condition upon the occurrence of an accident, exhaust opening means formed in said confinement for enabling fluid to flow from the interior of said confinement, and patch means for at least partially blocking said exhaust opening means until a predetermined fluid pressure is present within said confinement, the combination with said patch means and confinement of mounting means for enabling relative movement to occur between said patch means and said confinement while said patch means is at least partially blocking said exhaust opening means to thereby minimize the stress applied to said patch means by inflation of said confinement to the expanded condition and wherein one portion of said patch means is secured to said confinement while another portion of said patch means is free to move relative to said confinement.

18. In a safety apparatus including a confinement inflatable from a collapsed condition to an expanded condition in which said confinement is adapted to restrain movement of an occupant of the vehicle during an accident, means for supplying fluid to inflate said confinement from the collapsed condition to the expanded condition upon the occurrence of an accident, exhaust opening means formed in said confinement for enabling fluid to flow from the interior of said confinement, and patch means for at least partially blocking said exhaust opening means until a predetermined fluid pressure is present within said confinement, the combination with said patch means and confinement of mounting means for enabling relative movement in the direction of expansion of said confinement to occur between said patch means and said confinement while said patch means is at least partially blocking said exhaust opening means to thereby minimize the stress applied to said patch means by inflation of said confinement to the expanded condition and wherein a portion of said patch means on one side of said exhaust opening means is stitched to said confinement and another portion of said patch means extending transversely to said one portion is free to move relative to said confinement.